(12) United States Patent
Schwartz et al.

(10) Patent No.: US 11,636,994 B2
(45) Date of Patent: Apr. 25, 2023

(54) ATTACHING AN ISOLATED SINGLE STUD FUSE TO AN ELECTRICAL DEVICE

(71) Applicant: Littelfuse, Inc., Chicago, IL (US)

(72) Inventors: Geoffrey Schwartz, Stoughton, MA (US); Tiziano Bianchin, Verona (IT); Massimiliano Tinto, Verona (IT)

(73) Assignee: Littelfuse, Inc., Chicago, IL (US)

( * ) Notice: Subject to any disclaimer, the term of this patent is extended or adjusted under 35 U.S.C. 154(b) by 0 days.

(21) Appl. No.: 17/699,936

(22) Filed: Mar. 21, 2022

(65) Prior Publication Data

US 2022/0310348 A1 Sep. 29, 2022

Related U.S. Application Data

(60) Provisional application No. 63/165,371, filed on Mar. 24, 2021.

(51) Int. Cl.
| | | |
|---|---|---|
| *H01H 85/143* | (2006.01) | |
| *H01H 85/20* | (2006.01) | |
| *H01H 85/22* | (2006.01) | |
| H01H 85/08 | (2006.01) | |
| H01H 85/175 | (2006.01) | |
| H01R 4/30 | (2006.01) | |
| H01R 9/24 | (2006.01) | |

(52) U.S. Cl.
CPC ...... *H01H 85/2045* (2013.01); *H01H 85/143* (2013.01); *H01H 85/22* (2013.01); *H01H 85/08* (2013.01); *H01H 85/1755* (2013.01); *H01R 4/308* (2013.01); *H01R 9/2491* (2013.01)

(58) Field of Classification Search
CPC .. H01H 85/08; H01H 85/1755; H01H 85/143; H01H 85/2045; H01H 85/22; H01R 4/308; H01R 9/2491
See application file for complete search history.

(56) References Cited

U.S. PATENT DOCUMENTS

| | | | | |
|---|---|---|---|---|
| 2012/0064771 A1* | 3/2012 | Urrea | ............ | H01H 85/205 |
| | | | | 439/620.29 |
| 2012/0293295 A1* | 11/2012 | Kibushi | ............ | H01H 85/143 |
| | | | | 337/142 |
| 2013/0120101 A1* | 5/2013 | Taguchi | ............ | H01H 85/36 |
| | | | | 337/190 |

(Continued)

FOREIGN PATENT DOCUMENTS

EP 2993681 A1 3/2016

OTHER PUBLICATIONS

European Search Report dated Aug. 19, 2022 for European Patent Application No. 22161772.3.

*Primary Examiner* — Jacob R Crum
(74) *Attorney, Agent, or Firm* — KDW Firm Pllc

(57) ABSTRACT

An electrical device assembly and method to attach an isolated single stud fuse assembly to an electrical device are disclosed. The electrical device assembly consists of multiple studs, one or more of which is replaced with the isolated single stud fuse. A conductive copper landing zone receives an electrically isolated steel stud. When the landing pad assembly is orbital riveted into a plastic housing of the electrical device, the stud is locked into the housing permanently. Electrical devices such as disconnect switches and power distribution modules, both of which include multiple studs, are good candidates for being adapted with the single stud fuse assembly.

20 Claims, 12 Drawing Sheets

(56) References Cited

U.S. PATENT DOCUMENTS

| | | | |
|---|---|---|---|
| 2013/0202380 A1* | 8/2013 | Kawamura | F16B 41/002 |
| | | | 411/103 |
| 2016/0071678 A1* | 3/2016 | Schwartz | H01R 9/245 |
| | | | 361/115 |
| 2017/0345601 A1* | 11/2017 | Kitano | H01H 85/20 |
| 2017/0358417 A1* | 12/2017 | Schwartz | H01H 85/044 |
| 2017/0358418 A1* | 12/2017 | Carnick | H01H 85/0241 |
| 2020/0066472 A1* | 2/2020 | Haraguchi | H01H 85/143 |

* cited by examiner

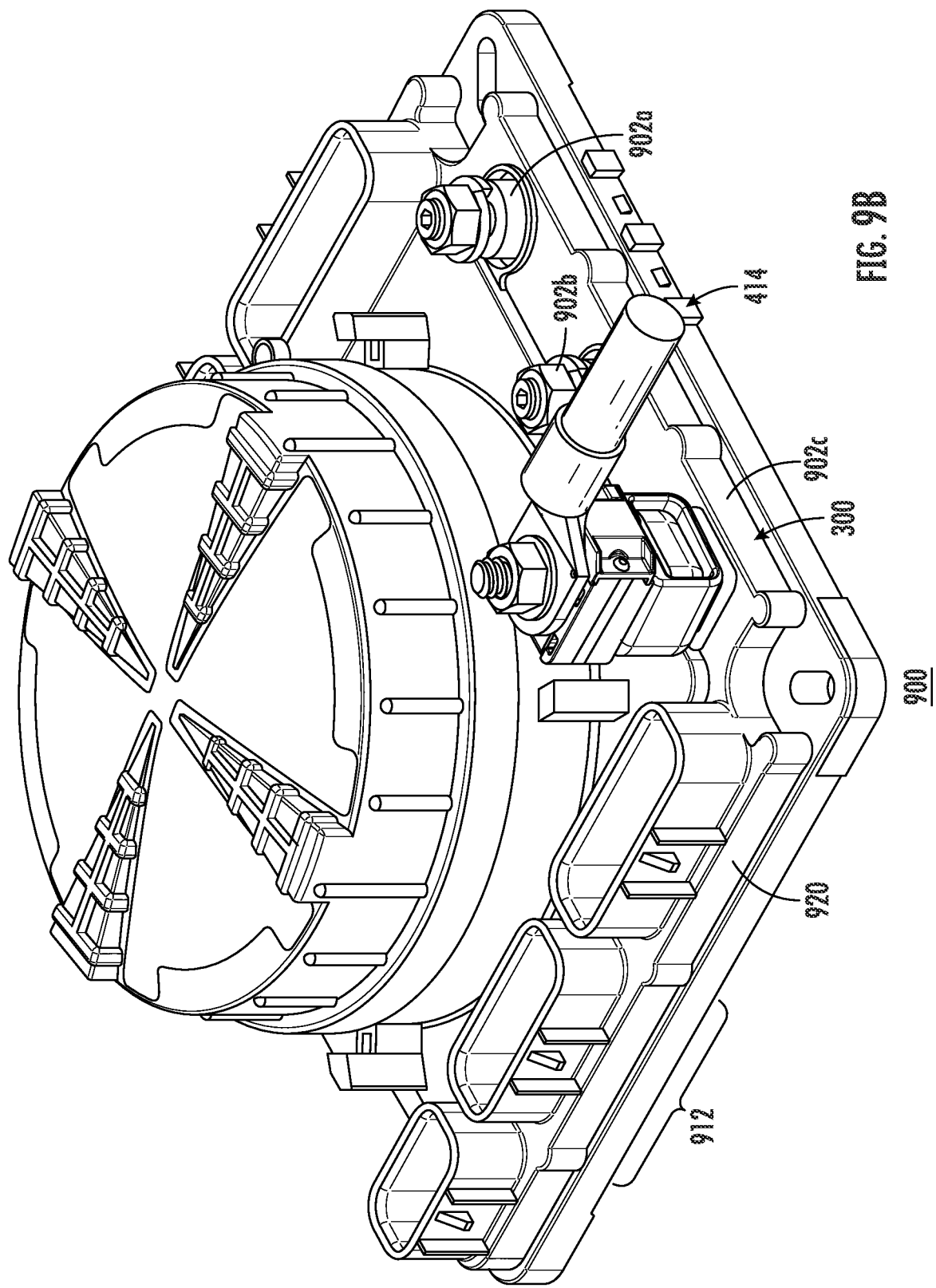

ATTACHING AN ISOLATED SINGLE STUD FUSE TO AN ELECTRICAL DEVICE

CROSS REFERENCE TO RELATED APPLICATION

This application claims the benefit of priority of U.S. Provisional Application No. 63/165,371, filed Mar. 24, 2021, entitled "ATTACHING AN ISOLATED SINGLE STUD FUSE TO AN ELECTRICAL DEVICE," which application is incorporated herein by reference in its entirety.

FIELD OF THE DISCLOSURE

Embodiments of the present disclosure relate to single stud fuses and, more particularly, to a novel way to attach the single stud fuse to assemblies including studs.

BACKGROUND

Fuses are current-sensitive devices designed to serve as the intentional weak link in an electrical circuit. Fuses provide protection of discrete components or of complete circuits by reliably melting under current overload conditions. Fuses come in a variety of packages and ratings to suit their intended application.

Single stud fuses, also known as battery terminal fuses, are a particular type of fuse package in which the fuse is attached to a device or circuitry by a threaded connection, such as a stud. The fuse includes a hole through which a single stud may be inserted to mechanically connect the fuse to the device or circuit. The studs are specially adapted, such as by being insulated or otherwise materially treated, so that they do not disrupt or become part of a current path through the fuses, ensuring that the single stud fuses operate as designed.

To use the single stud fuses, the specially treated stud is separated from the fuse, the fuse is attached to the circuit or device to be protected, the stud is inserted through the hole in the fuse. The special treatment of the stud ensures that current flows through the fuse and not through the stud when assembled.

There exist assemblies, such as disconnect switches and power distribution modules, which include studs, such as for connection to other circuitry or batteries. The studs of these assemblies are not specially treated as they are for the single stud fuse. Thus, adding the single stud fuse to these stud-based assemblies will render the fuse useless and unable to protect the circuitry of the assembly or of components connected to the circuitry.

It is with respect to these and other considerations that the present improvements may be useful.

SUMMARY

This Summary is provided to introduce a selection of concepts in a simplified form that are further described below in the Detailed Description. This Summary is not intended to identify key or essential features of the claimed subject matter, nor is it intended as an aid in determining the scope of the claimed subject matter.

An exemplary embodiment of an electrical device assembly in accordance with the present disclosure may include an electrical device and a single stud fuse assembly. The electrical device has a first stud that is to be connected to a first terminal. A receiving hole designed for a second stud is found in a housing of the electrical device. Instead of having the second stud, however, a landing pad shaft of a landing pad is orbitally riveted into the receiving hole. The landing pad, which is part of the single stud fuse assembly, also features a stud base receptacle to which a stud base of an electrically isolated stud, also part of the single stud fuse assembly, is inserted. The single stud fuse assembly also includes a single stud fuse with a shaft receptacle, and a stud shaft of the electrically isolated stud is disposed through the shaft receptacle before being connected to a second terminal.

Another exemplary embodiment of an electrical device in accordance with the present disclosure may include first and second studs and first and second nuts. A terminal of a battery is to be placed over the first stud before securing the first nut. A busbar within a housing of the electrical device is connected to the first stud. The second nut and second stud are removed, leaving a pocket in the housing. The electrical device also features a landing pad with a landing pad shaft and a rectangular receptacle. The landing pad is orbital riveted into the pocket until the landing pad shaft is connected to the busbar. Finally, the electrical device features an electrically isolated stud, which includes both a stud shaft and a stud base. The stud base fits into a side opening of the rectangular receptacle and the stud shaft receives a single stud fuse and a second terminal of the battery.

An exemplary embodiment of an electrical device assembly in accordance with the present disclosure may include an electrical device and a fuse assembly The electrical device includes a first stud to be connected to a first terminal of a second electronic device, a receiving hole in a plastic housing, and a busbar. The busbar has first and second portions, with the first busbar portion being connected to the first stud. The fuse assembly includes a fuse, a landing pad shaft, and an electrically isolated stud. The fuse is in a rectangular cubic housing which has a fusing element along a side edge and a shaft receptacle centrally located in the housing. The landing pad shaft is connected to a stud base receptacle and the two parts are machined from a unitary metal piece made of electrically conductive material. The electrically isolated stud has a stud base that is to be slid into a side opening of the stud base receptacle. The landing pad shaft is disposed into the receiving hole until the second busbar portion is connected to the landing pad shaft.

BRIEF DESCRIPTION OF THE DRAWINGS

FIGS. 9A and 9B are diagrams illustrating a power distribution module including the single stud fuse assembly of FIG. 3, in accordance with exemplary embodiments.

DETAILED DESCRIPTION

An electrical device assembly and method to attach an isolated single stud fuse assembly to an electrical device are disclosed. The electrical device assembly consists of multiple studs or studs, one or more of which is replaced with the isolated single stud fuse. A separate conductive copper landing zone allows the terminal attached to the electrical device to get a good electrical connection while ensuring that the single stud fuse is able to protect the electrical device as well as circuitry connected to the electrical device. The steel stud inserts slide into the landing zone, which allows higher torque for connections than with solid copper one-piece studs. The landing pad assembly is orbital riveted into a plastic housing of the electrical device, locking the assembly into the housing permanently. Further, a much better sealing of the connection is made compared to using a steel stud going through a busbar. Electrical devices such as disconnect switches and power distribution modules, both of which include multiple studs, are good candidates for the electrical device assembly and method for connecting the single stud fuse assembly to the electrical device disclosed herein.

Figure 1A:
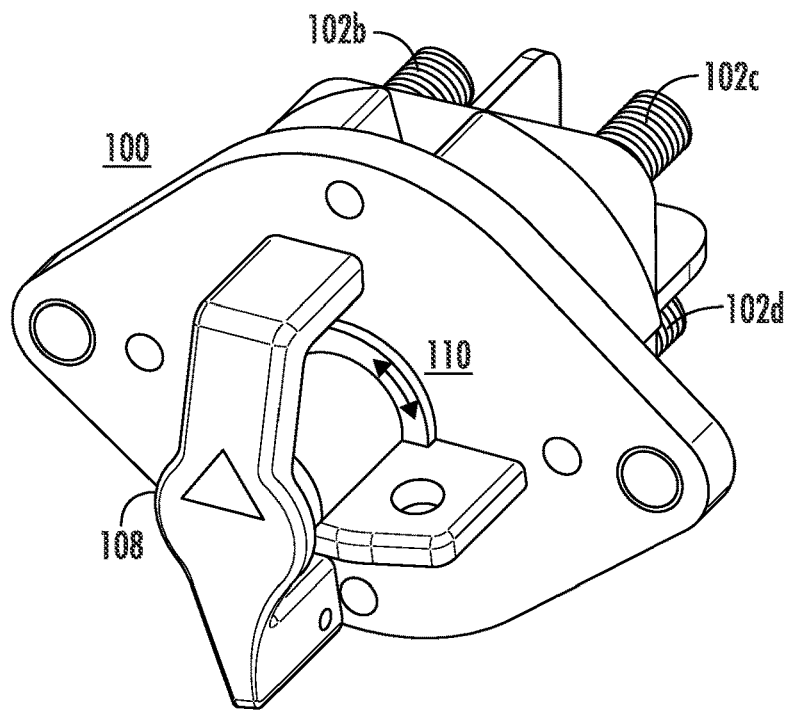
FIGS. 1A and 1B are diagrams illustrating a disconnect switch, according to the prior art.
Figure 1B:
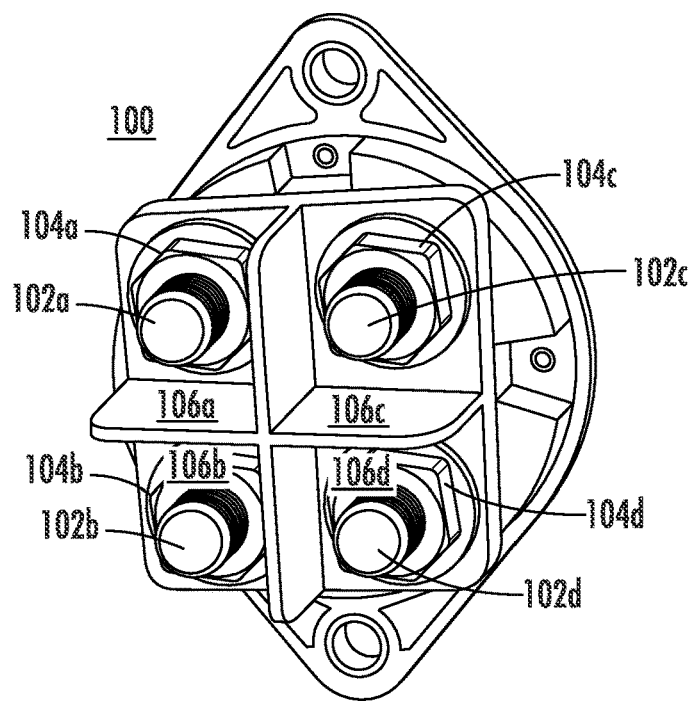

FIGS. 1A and 1B are representative images of a disconnect switch 100 for electrical applications, according to the prior art. FIG. 1A is a perspective view and FIG. 1B is a bottom perspective view of the disconnect switch 100, where the bottom perspective view is oriented in a direction orthogonal to the perspective view. Typically used in high power applications, the disconnect switch 100 is a double pole, single throw (DPST) type switch that isolates two circuits at one time, circuits with two different voltages, or both the positive and negative of the same circuit. The disconnect switch 100 may be used in industrial applications for heavy equipment, such as earth moving equipment. The disconnect switch 100 may be used, for example, as a safety device for immobilization of hazardous moving parts, to disable power when the vehicle is not in use or during maintenance, and to provide security against theft. The disconnect switch 100 is made of an engineered polymer construction to avoid rust and corrosion and is lever-actuated.

Four studs 102a, 102b, 102c, and 102d (collectively, "studs 102") are used to make connection to up to two different circuits. Each stud 102 further includes a respective hex nut 104a, 104b, 104c, and 104d (collectively, "hex nuts 104"), visible in FIG. 1B, for enabling the circuit connections. To connect the disconnect switch 100 to a circuit to be protected, such as a battery on an industrial vehicle, the hex nuts 104 associated with two of the studs 102 are removed for attachment of the studs to battery or power cables. The hex nuts 104 are then resecured on the respective studs 102, enabling the disconnect switch 100 to become part of the closed circuit.

To aid in describing the disconnect switch 100, four quadrants 106a, 106b, 106c, and 106d (collectively, "quadrants 106") are visible in FIG. 1B, with the stud 102a and hex nut 104a being in quadrant 106a, stud 102b and hex nut 104b being in quadrant 106b, and so on. The disconnect switch 100 further includes a dual-position lever 108 for switching the disconnect switch ON or OFF.

As an illustrative example, suppose a circuit, such as a battery on an industrial vehicle, has one terminal connected to quadrant 106a and the other terminal connected to quadrant 106c. When the lever 108 is in one position, the stud 102a in quadrant 106a is connected to the stud 102c in quadrant 106c inside the disconnect switch 100, causing a closed circuit in which the battery is operable (disconnect switch is ON). When the lever 108 is in a second position, the stud 102a in quadrant 106a is disconnected from the stud 102c in quadrant 106c inside the disconnect switch 100, causing an open circuit in which the battery is disabled (disconnect switch is OFF).

The disconnect switch 100 also includes apertures 112 for receiving a lock, enabling the disconnect switch to be secured in either the ON or the OFF position. Particularly when locked in the OFF state, the disconnect switch 100 may be thought of as a protective device because it protects the vehicle or other electrical device that includes the circuit to which the disconnect switch is connected.

Figure 2A:
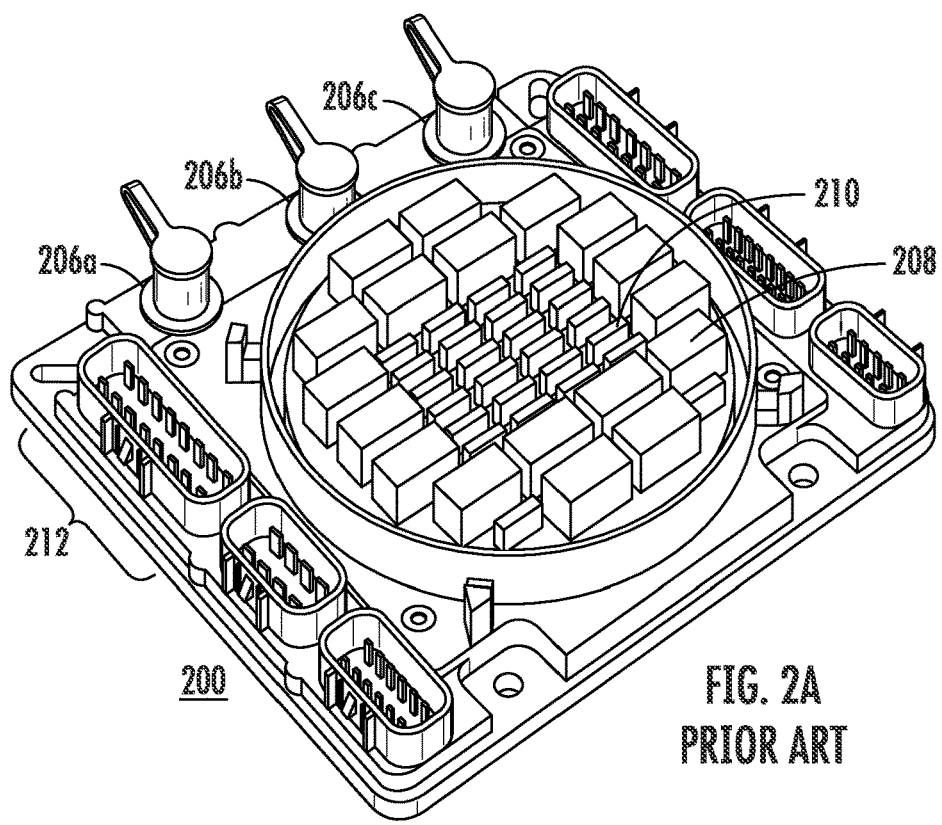
FIGS. 2A and 2B are diagrams illustrating a power distribution module, according to the prior art.
Figure 2B:
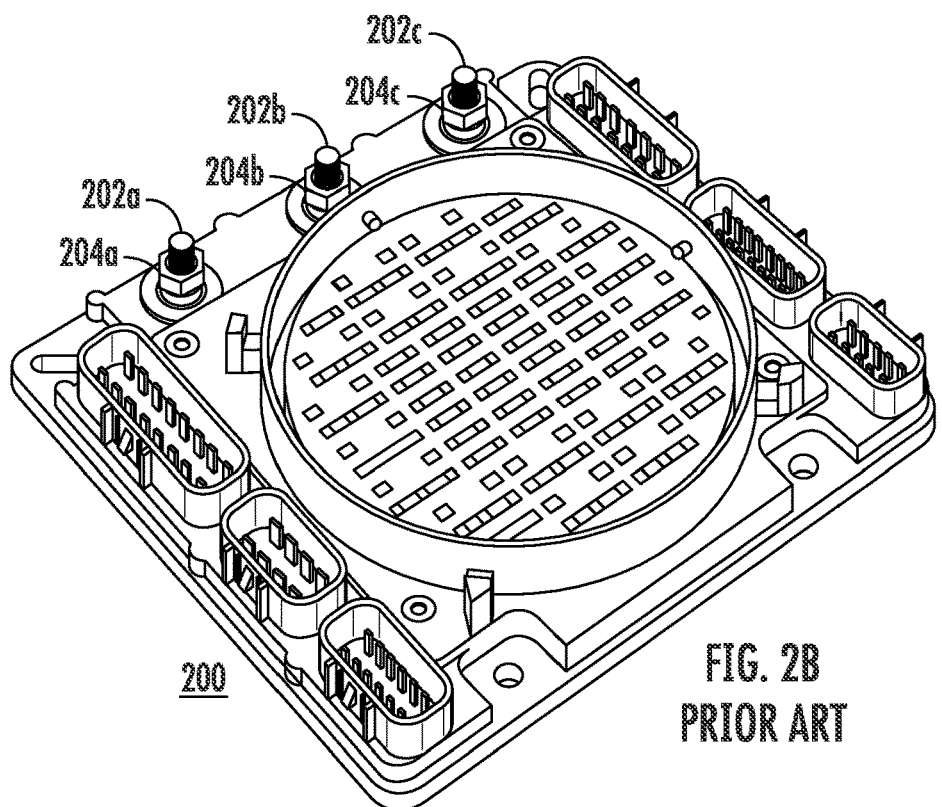

FIGS. 2A and 2B are representative images of a power distribution module (PDM) 200 for electrical applications, according to the prior art. FIGS. 2A is a perspective view of the PDM 200 including relays and fuses and FIG. 2B is a perspective view of the PDM 200 without the connected components. PDMs are installed in applications to ensure circuits are protected, controlled, and/or sensed. PDMs provide centralized, safe power distribution for many applications, and may include fuses, relays, circuit breakers, current sensing components, and Controller Area Network (CAN) and Local Interconnect Network (LIN) modules. Though PDMs are well-known on industrial applications, such as heavy-duty trucks and agricultural and construction equipment, the applications for PDMs are expanding, particularly in the automotive industry.

Three studs 202a, 202b, and 202c (collectively, "studs 202") are used to make connection to up to two different circuits. The studs 202 for the PDM 200 happen to be M8-type studs. Each stud 202 further includes a respective hex nut 204a, 204b, and 204c (collectively, "hex nuts 204"), visible in FIG. 2B, for enabling the circuit connections. The PDM 200 also includes caps 206a, 206b, and 206c (collectively, "caps 206"), which cover the respective studs 202. The stud 202a is a ground stud, with the respective cap 206a being indicated in a first color shade, while the studs 202b and 202c are power studs, with the respective caps 206b and 206c being indicated in a second color shade.

To connect the PDM 200 to a circuit to be protected, such as a battery on an industrial vehicle, the hex nuts 204 associated with two of the studs 202, one of the studs being the ground stud 202a, are removed for attachment to battery terminals or power cables. The hex nuts 204 are then resecured on the respective studs 202, enabling the PDM to become part of the closed circuit.

FIG. 2A shows multiple relays, with one relay 208 being indicated, and multiple fuses, with one fuse 210 being indicated. There are also multiple connectors, with one connector 212 being indicated. While the studs 202 connect the PDM 200 to battery or power cables, each connector establishes a connection between the PDM and other electrical circuits, such as inside a vehicle, of which there may be many, with the relays and fuses supporting those circuits.

As an illustrative example, suppose a circuit, such as a battery on an industrial vehicle, has one terminal connected to stud 202a (ground) and the other terminal connected to stud 202b (power), with the respective hex nuts 204 securing the terminals to the PDM 200. The result is a closed circuit in which the PDM is connected to the battery. When the connector for the lighting circuit of the vehicle is inserted into one of the connectors, the fuses and relays of the PDM 200 are able to protect and enable the various lights within the vehicle. A second connector for the cooling system, a third connector for the transmission, and so on, can be connected to the PDM 200, providing power, protection, and enablement to each of the different circuits. The PDM 200 thus provides a centralized, safe power distribution for the various electrical systems within the vehicle.

The disconnect switch 100 and the power distribution module 200 are examples of an electrical device that is part of an electrical circuit, to which connection is made by cables, harnesses, terminals, or the like, the electrical device having a hole to be blocked (and electrically connected) between a stud and a nut. It may be desirable for the electrical device, in one or more locations, to additionally be protected by a fuse. Single stud fuses feature a shaft receptacle (aperture) for receiving a specialized insulated stud. Typically, the insulated stud goes through a bus bar and the bus bar goes to a metal terminal known as a "landing zone". Such a path is very difficult to seal and so the electrical device may not have sufficient protection against water and/or dust. Further, the sizes of the stud used to connect the fuse to the electrical device is difficult to vary.

Figure 3:
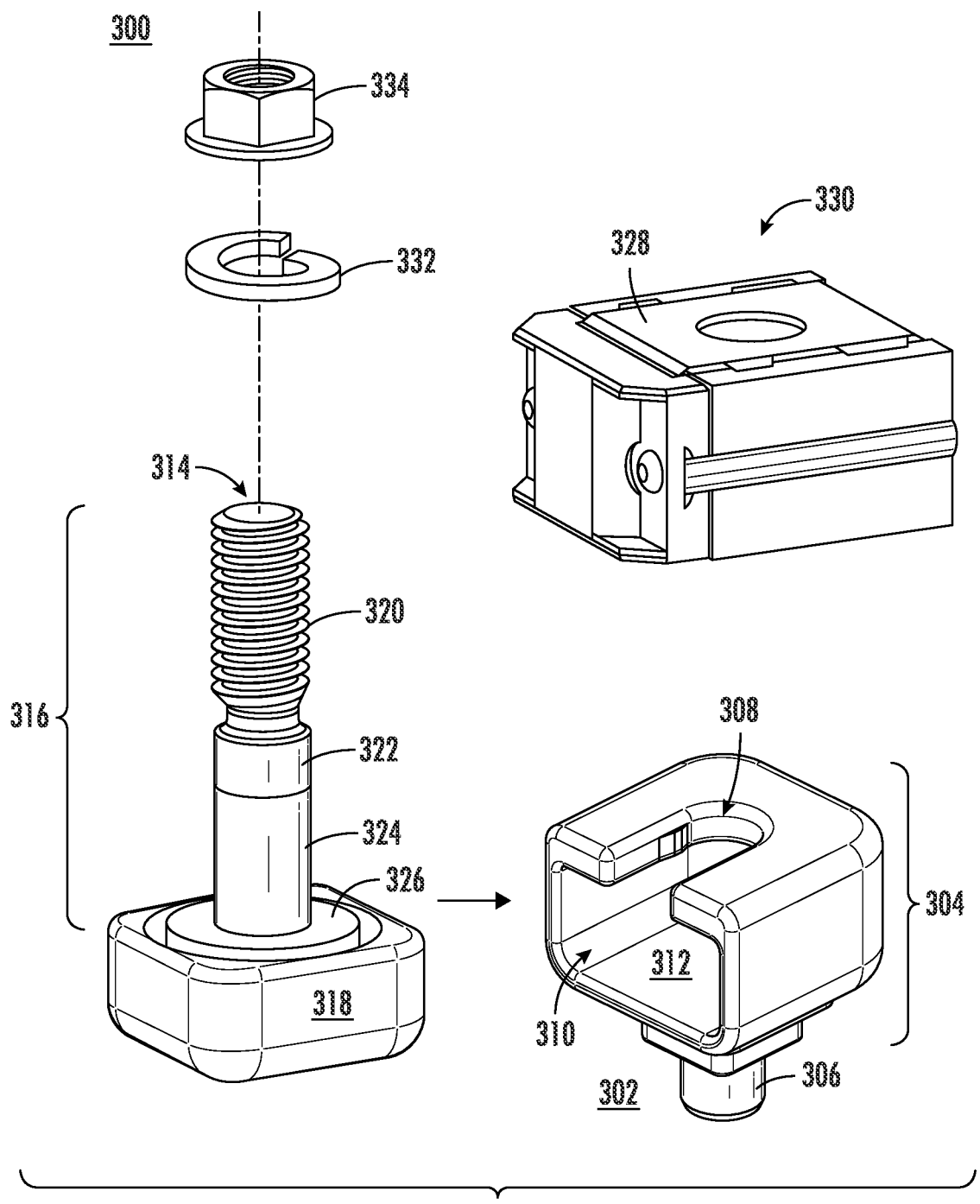
FIG. 3 is a diagram of a single stud fuse assembly, in accordance with exemplary embodiments.

FIG. 3 is a representative drawing of a single stud fuse assembly 300, according to exemplary embodiments. The single stud fuse assembly 300 features a metal terminal 302, also known as a landing pad 302, and an electrically isolated stud 314, a single stud fuse 328, an optional washer 332, and a nut 334. In an exemplary embodiment, the nut 334 is a hex nut. The landing pad 302 features a stud base receptacle 304 and a shaft 306, known also herein as a landing pad shaft 306.

The stud base receptacle 304 is shaped to receive a stud base 318 of the stud 314. The stud base has an insulated portion 318a that surrounds a metal portion 318b (collectively, "stud base 318"), as illustrated in the cross-sectional view of FIG. 5, below. The landing pad 302 further includes a side opening 310, revealing a hollow interior 312, as well as an inset portion 308. In exemplary embodiments, the shaft 306 and the stud base receptacle 304 of the metal terminal 302, including the side opening 310 and the inset portion 308, are machined from a unitary metal piece made of electrically conductive material, such as copper or a copper alloy.

The steel stud 314 features a shaft 316, known also herein as a stud shaft 316, which has a threaded portion 320, an unthreaded portion 322, an insulated portion 324, an optional integrated washer 326, and a base 318. In addition to the insulated portion 324 of the shaft 316 being insulated, the optional integrated washer 326 and the stud base 318 are also insulated so as to isolate them from current transmitted through the single stud fuse 328. Thus, the stud 314 may be thought of as an electrically isolated stud. In addition to providing insulation so as to prevent current flow through the stud 314, the optional integrated washer 326 also helps to withstand pressure after the single stud fuse assembly 300 is secured to an electrical device, such as a disconnect switch (FIGS. 1A and 1B) or power distribution module (FIGS. 2A and 2B), by the nut 334. In an alternative embodiment, the insulation of the stud base 318 is sufficient to prevent current flow through the stud 314 and to withstand high mechanical pressures during torque of the nut 334. Thus, the stud 314 may be configured without the optional integrated washer 326. Alternatively, the shaft 316 of the stud 314 can be secured by a nut having an integrated washer, such as a flange nut, a trilobate nut, or other type of nut that can be used without a washer. In an exemplary embodiment, the insulated components of the stud 314 are insulated using electrically insulating material, such as overmolded plastic, though other insulation materials may also be used.

In an exemplary embodiment, the stud base receptacle 304 is a rectangular cube shape of a first dimension. The hollow interior 312 is of a second dimension smaller than the first dimension. As indicated by the arrow in FIG. 3, the stud base 318, which is a third dimension, fits snugly into the hollow interior 312 of the stud base receptacle 304. Thus, the second dimension is slightly greater than the third dimension, allowing the stud base 318 to fit into the hollow interior 312 via the side opening 310 of the stud base receptacle 304. The inset portion 308 of the stud base receptacle 304 is disposed opposite the shaft 306, and the shaft 316 of the stud 314 fits into the inset portion 308 as the stud base 318 is laterally presented into the stud base receptacle 304.

Once inserted into the landing pad 302, the insulated steel stud 314 may be captured or mechanically locked in the stud base receptacle 304. In an exemplary embodiment, orbital riveting, a mechanical bottleneck, a secondary lock, or other means are employed to mechanically lock the stud 314 to the landing pad 302.

The single stud fuse assembly 300 further includes the single stud fuse 328, which has a cylindrically shaped shaft receptacle 330 for receiving the stud 314. Both the unthreaded portion 322 and the insulated portion 324 of the shaft 316 are disposed within the shaft receptacle 330 of the single stud fuse 328. In an exemplary embodiment, the shaft 316 is insulated from a bottom portion of the fuse terminal, ensuring that the stud 314 will not conduct the fuse element (not shown) within the fuse 328. The insulation may be higher than is shown. In an exemplary embodiment, the threaded portion 320 of the shaft 316 extends to the top of the fuse 328. In an exemplary embodiment, the insulating layer/portion 324 and the insulating washer 326 of the single stud fuse assembly 300 isolates the stud 314 from the fuse 328.

Once inserted through the shaft receptacle 330, the shaft 316 will have enough clearance above the fuse 328 to receive a female pole (such as the power cable lug 414 FIGS. 4A and 4B, below), harness, or other terminal device, though the power cable lug is not part of the single stud fuse assembly 300. An optional washer 332 may be disposed over the power cable lug onto the shaft 320 of the stud 314. Finally, the nut 334 is used to secure the components of the single stud fuse assembly 300.

Figure 4A:
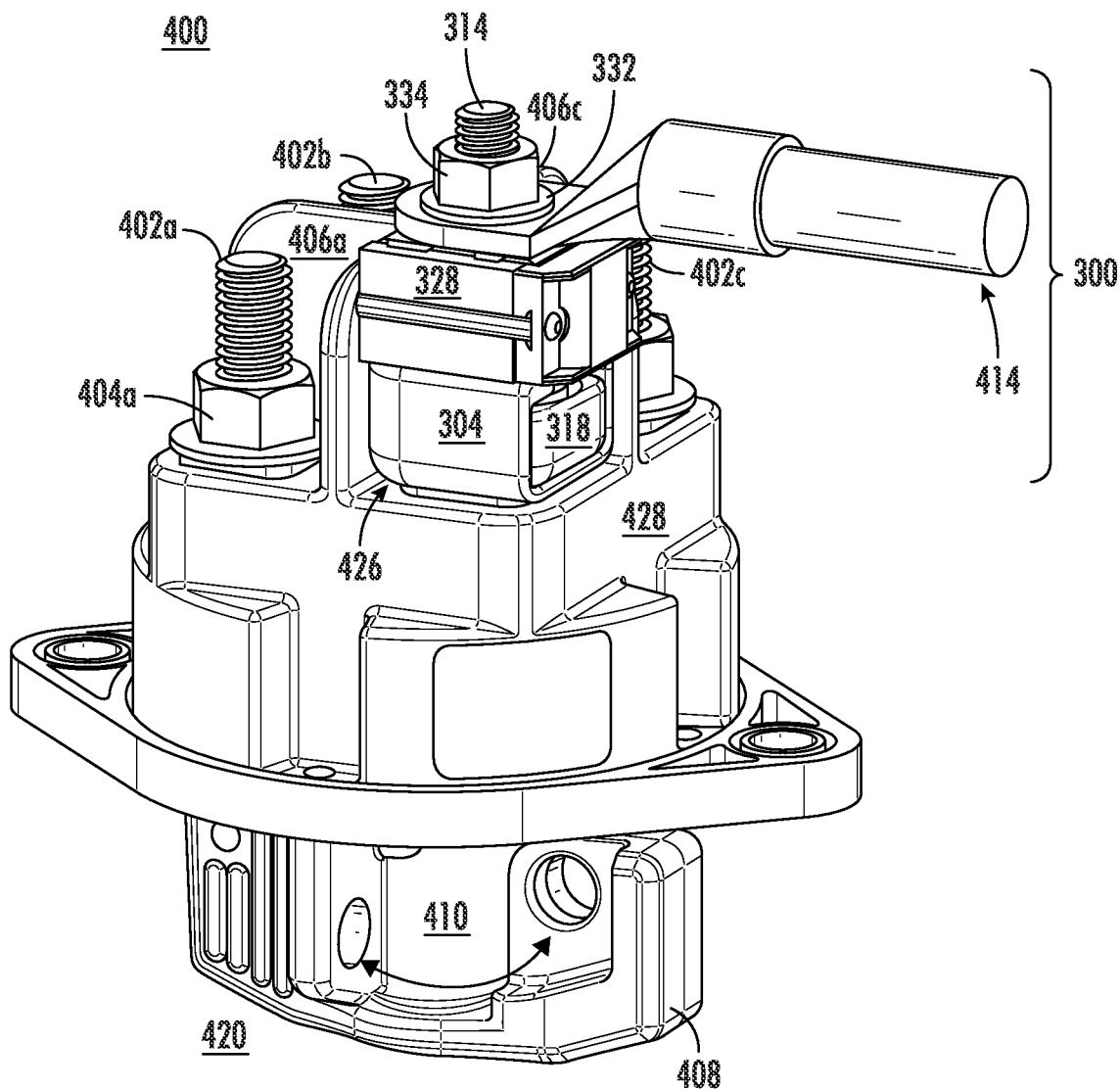
FIGS. 4A and 4B are diagrams illustrating an disconnect switch assembly for securing an isolated single stud fuse, in accordance with exemplary embodiments.
Figure 4B:
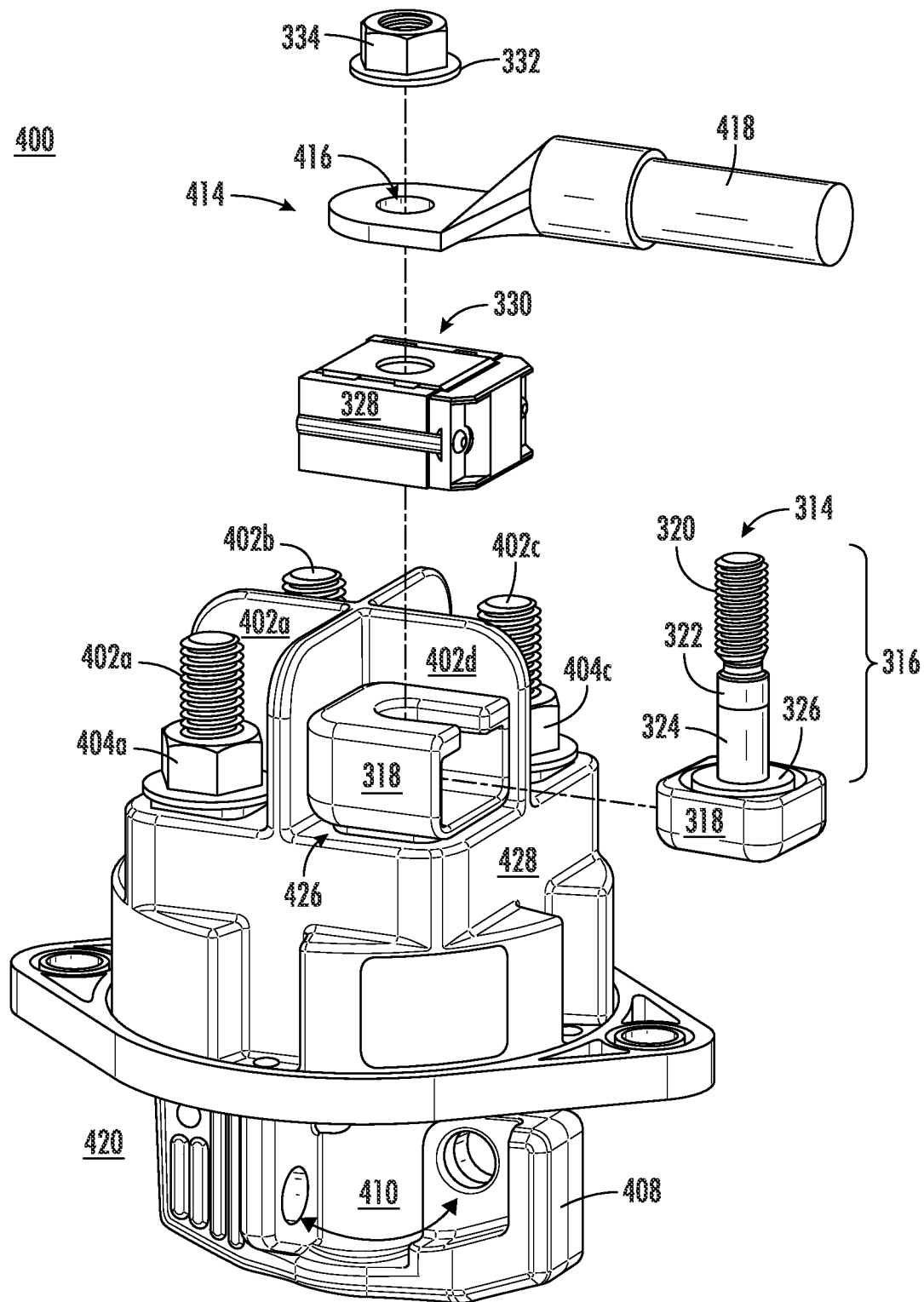

FIGS. 4A and 4B are representative drawings of a device assembly 400 including the single stud fuse assembly 300 of FIG. 3 and a disconnect switch 420, according to exemplary embodiments. FIG. 4A is a perspective view and FIG. 4B is an exploded perspective view of the device assembly 400. The disconnect switch 420 is similar to the disconnect switch 100 (FIGS. 1A and 1B), with one of the studs being replaced with the single stud fuse assembly 300. The disconnect switch 420 is representative of an electrical device that is part of an electrical circuit to which connection is made using terminals, cables, harnesses, or the like, the electrical device including a hole to be blocked and electrically connected between a stud and a nut. The device assembly 400 introduces, in the middle of the connection, an electrical protection, by replacing each stud to be protected with a system consisting of a landing pad plus an insulated stud plus a fuse, in other words, the single stud fuse assembly 300.

The disconnect switch 420 features three studs 402a, 402b, and 402c (collectively, "studs 402"), each having an associated hex nut 404a, 404b (not shown), and 404c (collectively, "hex nuts 404"). The disconnect switch 420 features four quadrants 406a, 406b, 406c, and 406d (collectively, "quadrants 406"). The stud and hex nut of quadrant 406d are removed and replaced with the single stud fuse assembly 300. A dual position lever 408 enables the disconnect switch 420 to be turned ON or OFF. Apertures 410 enable a locking mechanism to be attached so as to secure the disconnect switch 520 in either the ON or OFF position.

In FIG. 4A, the single stud fuse assembly 300 is shown secured to the disconnect switch 420. The threaded stud 306 (not shown) of the landing pad 310 is disposed inside a cylindrical receiving hole or pocket (not shown) in the plastic housing 428 of the disconnect switch 420 in place of the stud and hex nuts that would otherwise occupy the quadrant 406d. The receiving hole or pocket may be cylindrical in shape and may be threaded or unthreaded. As a result, the stud base receptacle 304 fits into the rectangular cube-shaped quadrant 406d such that the receptacle is seated atop a horizontal surface 426 of the quadrant. Further, in an exemplary embodiment, the shaft 306 of the landing pad 302 is orbital riveted into the receiving hole or pocket of the plastic housing 428, thus becoming an encapsulated pole inside the disconnect switch 420.

The stud 314 includes the stud base 318 which fits into the stud base receptacle 304 of the landing pad 302. The stud base 318 creates a steel stud insert that slides into the stud base receptacle 304. Steel, whether stainless, nickel-plated, zinc-plated, and so on, has a much higher tensile strength than copper, allowing higher torque for connections than with solid copper one piece studs. The fuse 328 is then inserted onto the shaft 316 of the stud 314, through the shaft receptacle 330, such that the fuse is disposed over the stud base receptacle 304.

Between the single stud fuse 412 and the optional washer 422 and hex nut 420 is a power cable lug 414. The power cable lug 414 is not part of the single stud fuse assembly 300, but is instead supplied by the customer. The power cable lug 414 features a cable lug aperture 416, for diposing over the shaft 316 of the stud 314, and a cable 418 for electrically connecting the disconnect switch 420 to other circuitry, such as a battery. In one embodiment, the optional washer 422 and hex nut 420 are then inserted onto the shaft 316 of the stud 314 and secured. In a second embodiment, the hex nut 420 without the optional washer is inserted onto the shaft 316 of the stud 314 and secured.

Figure 5:
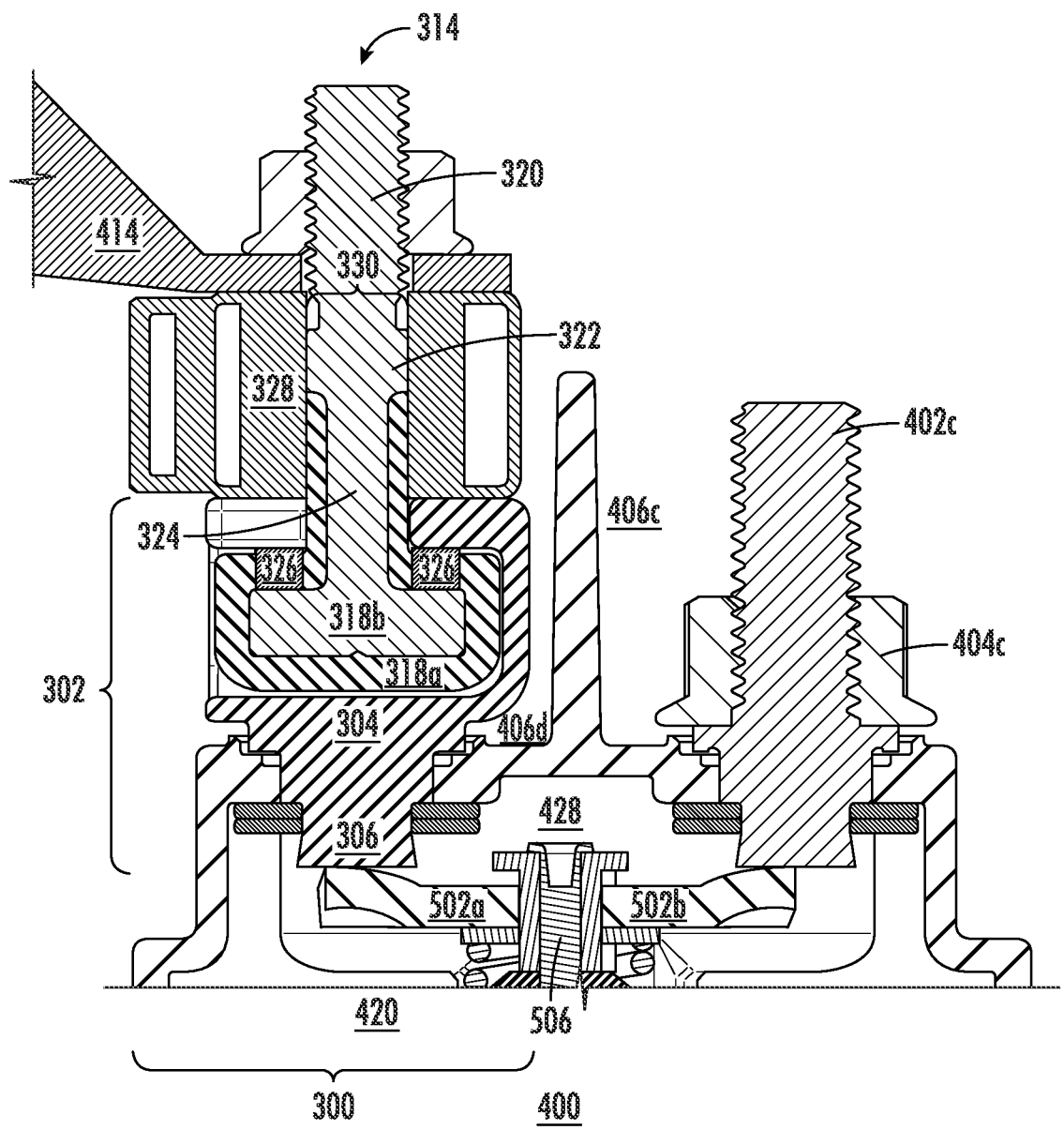
FIG. 5 is a diagram illustrating the disconnect switch assembly of FIGS. 4A and 4B, in accordance with exemplary embodiments.

FIG. 5 is a cross-sectional view of the device assembly 400, according to exemplary embodiments. The device assembly 400 features the disconnect switch 420 and the single stud fuse assembly 300. The cross-sectional view shows quadrant 406d, which includes the single fuse assembly 300, and quadrant 406c, which is adjacent to quadrant 406d. The landing pad 302 is shown, with the stud base receptacle 304 surrounding the stud base 318 of the stud 314. The stud 314 features the threaded portion 320, which is disposed above the single stud fuse 328, the unthreaded portion 322, which is disposed inside the shaft receptacle 330 of the single stud fuse 328, the insulated portion, which is disposed between the stud base receptacle 304 and the bottom of the single stud fuse 328, the optional integrated washer 326, and the stud base 318, both the insulated portion 318a and the steel portion 318b visible.

The shaft 306 of the landing pad 302 fits into the plastic housing 428 of quadrant 406d of the disconnect switch 420, much like the stud 402c fits into the plastic housing 428 of quadrant 406c. The shaft 306 is electrically connected to a first busbar portion 502a, which is connected to a second busbar portion 502b (collectively, "busbar 502"), and the second busbar portion 502b is electrically connected to the stud 402c. Thus, by way of the busbar 402, the single stud fuse assembly 300 in quadrant 406d is electrically connected to the stud 402c in quadrant 406c.

Thus, current may flow from a terminal (not shown) connected to the stud 402c, through the busbar 502, into the single stud fuse assembly 300, and out the power cable lug 414, and vice-versa. As explained above, the insulation of the stud 314 ensures that electrical current coming passing through the single stud fuse assembly 300 does not travel through the stud 314, but instead passes from the metal terminal of the landing pad 302 through the fuse 328, and vice-versa.

The power cable lug 414 is shown connected to the single stud fuse assembly 300 in quadrant 406d and may be a terminal for a battery, as one example. When a second terminal is connected to the stud 402c, the disconnect switch 420 becomes part of a closed circuit including the battery. A lever assembly 506 disposed between the first busbar portion 502a and the second busbar portion 502b is connected to the lever 408, which is not shown in FIG. 5 but is shown in FIGS. 4A and 4B). Accordingly, the lever 408 is able to disconnect the first busbar portion 502a from the second busbar portion 502b. This operation would open the circuit including the battery, thus disabling the battery from being operable.

In an exemplary embodiment, the shaft 306 and landing pad 304 of the single stud fuse assembly 300 are orbital riveted to the plastic housing 428. The orbital riveting operation locks the shaft 306 in place in the receiving hole or pocket of the plastic housing 428, so that the shaft cannot be removed or backed out. Once the shaft 306 of the landing pad 302 is orbital riveted into the plastic housing 428, the shaft 306 appears wider and shorter, as shown in FIG. 5. The riveting operation ensures an electrical connection of the shaft 306 to the busbar 502, which is a moveable component. The stud 402c also makes an electrical connection to the busbar 502 during its installation. The orbital riveting of the shaft 306 to the busbar 502 allows much better sealing of the connection compared to a steel stud going through the busbar, in exemplary embodiments. Thus, once installed in the disconnect switch 420, the landing pad 302 will not be removable from the quadrant 406d.

In an exemplary embodiment, the stud base 318 of the electrically isolated stud 314 is inserted into the stud base receptacle 304 before the landing pad 302 is orbital riveted into the plastic housing 428 of the disconnect switch 420. This prevents the stud 314 from being removable from the landing pad 302. In another embodiment, the landing pad 302 is orbital riveted into the plastic housing 428 before the stud base 318 of the electrically isolated stud 314 is inserted into the stud base receptacle 304. Because their physical design ensures a secure mating, no additional securing mechanism of the stud base 318 to the stud base receptacle 304 is needed. Nevertheless, the stud base 318 may optionally be orbital riveted, locked with a secondary lock, inserted using a bottleneck, or otherwise further secured. Once installed, the stud 314 is strongly connected with the landing pad 302 and secured with the nut 334, ensuring that the stud 314 does not get lost during goods handling, such as transport, in assembly line, etc.

In an exemplary embodiment, the disconnect switch 420 can be mounted in a vehicle near a wall, with the quadrant 406c being positioned against the wall such that the stud base 318 cannot be moved horizontally out of the stud base receptacle 304. An "against a wall" positioning of the disconnect switch 420 would not prevent the single stud fuse 328 from being removed, as fuse removal would still be available to the customer should the fusible element be broken.

In FIG. 5, the stud 314 appears to be thinner than the stud 402c. In an exemplary embodiment, the device assembly 400 can be used with different sizes of studs. The studs may be M6, M8, or M10, for example, and the configuration illustrated in FIGS. 4A, 4B, and 5 would not otherwise change. In an exemplary embodiment, the shaft 306 of the landing pad 302 is sized to fit into the receiving hole or pocket of the plastic housing 428. The size of the shaft 306, however, does not impact the size of the threaded portion 320 of the stud shaft 316 of the stud 314. Thus, with the single stud fuse assembly 300, the shaft 316 of the stud 314 could change, while the shaft 306 of the landing pad 302 would not change, and would be sized to fit into the plastic housing 428 of the disconnect switch 420. This allows end of line adjustments to customer variations.

Further, in an exemplary embodiment, any location on the disconnect switch 420 can be assembled with any one of the stud sizes. Thus, the single stud fuse assembly 300 can occupy any of the four quadrants 406 of the disconnect switch 420. Further, the single stud fuse assembly 300 can be placed in two of the four quadrants 406, such as when the disconnect switch 420 is connected to two different circuits, thus providing fuse protection for both circuits.

Figure 6:
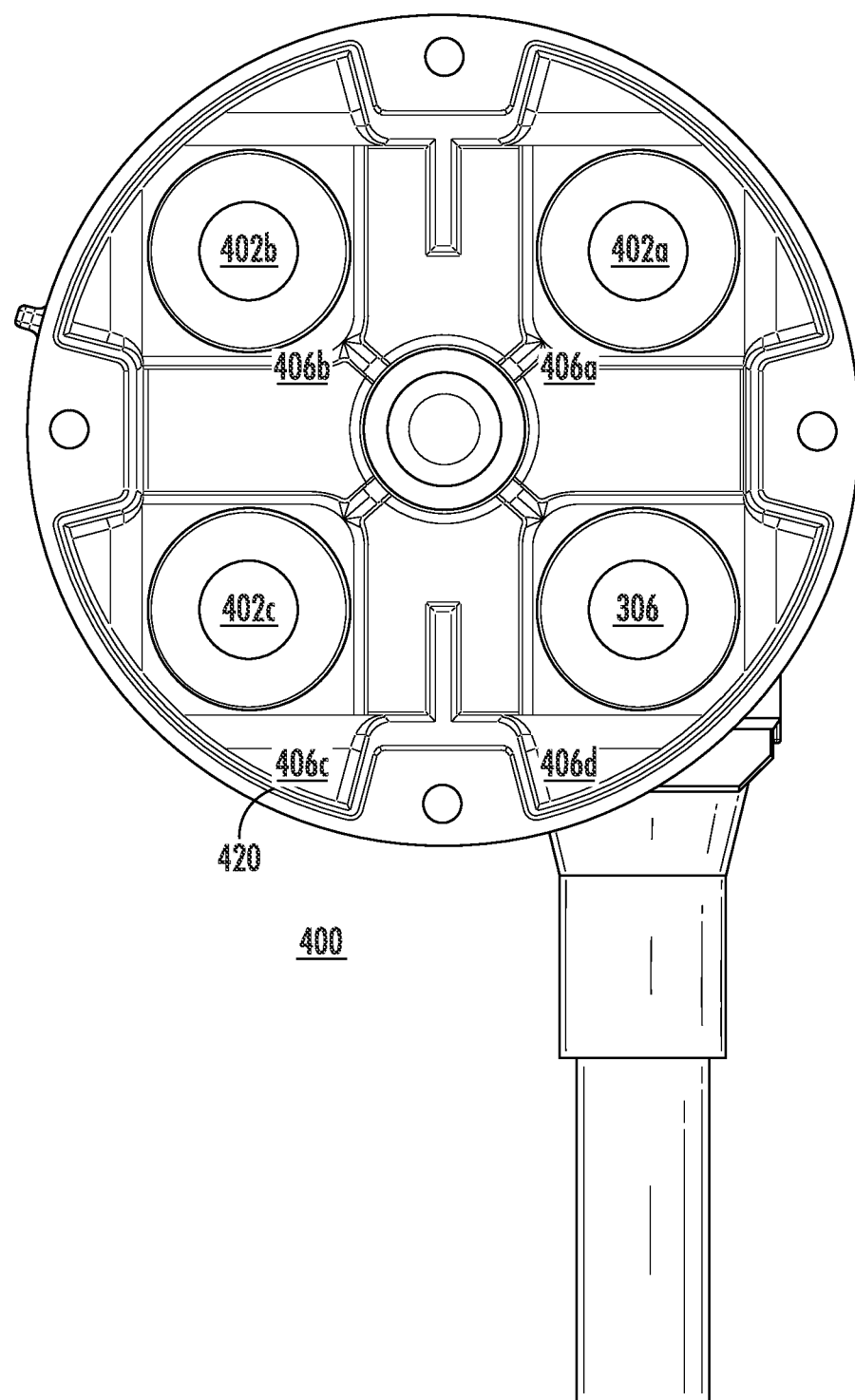
FIG. 6 is a diagram illustrating the disconnect switch assembly of FIGS. 4A and 4B, in accordance with exemplary embodiments.

FIG. 6 is a bottom view of the device assembly 400, according to exemplary embodiments. The device assembly 400 features the disconnect switch 420 with the bottom portion including the lever not being included, as in FIG. 5. The four quadrants 406 are visible, with studs 402 occupying three of the quadrants, and the single stud fuse assembly 300 occupying the quadrant 406d. The shaft 306 is visible in the fourth quadrant, with the power cable lug 414 being partially visible.

Figure 7A:
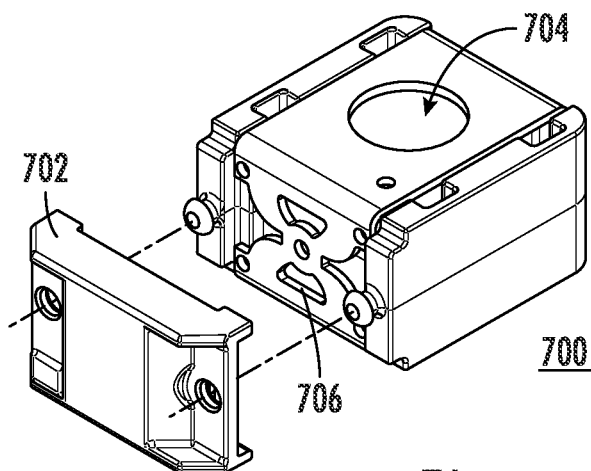
FIGS. 7A-7C are diagrams the single stud fuse used in the single stud fuse assembly of FIG. 3, in accordance with exemplary embodiments.
Figure 7B:
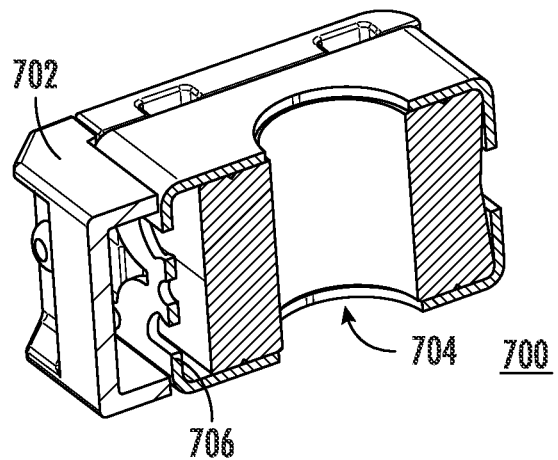
Figure 7C:
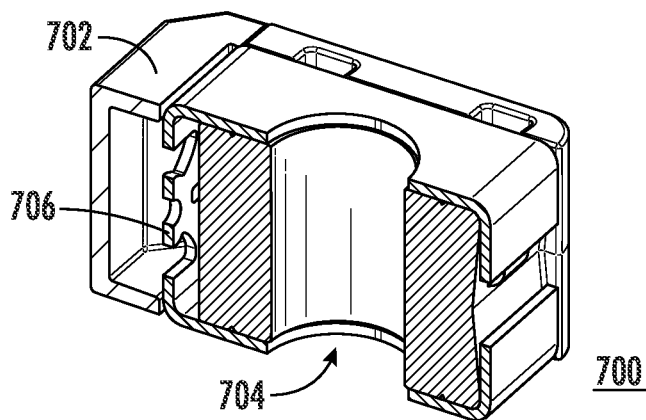

FIGS. 7A-7C are perspective cutaway illustrations of a single stud fuse 700 suitable for the single stud fuse assembly 300 and the device assembly 400 featuring both the single stud fuse assembly 300 and the disconnect switch 420, according to exemplary embodiments. In an exemplary embodiment, the single stud fuse 700 features a rectangular cubic housing. A cover portion 702, when removed, reveals a fusing element 706 disposed to one side of the fuse 700. The fusing element 706 is the intentional weak link of the single stud fuse 700 that is designed to break upon the occurrence of an overload event, such as overcurrent, overvoltage, or both. A shaft receptacle 704 is for receiving an insulated shaft, such as the shaft 316 of the insulated stud 314 described above. In an exemplary embodiment, the fusing element 706 is disposed to one side of the rectangular cubic housing while the shaft receptacle 704 is more centrally located within the housing. Other configurations are possible, though, in exemplary embodiments, the shaft receptacle 704 is both physically and electrically isolated from the fusing element 706.

Figure 8:
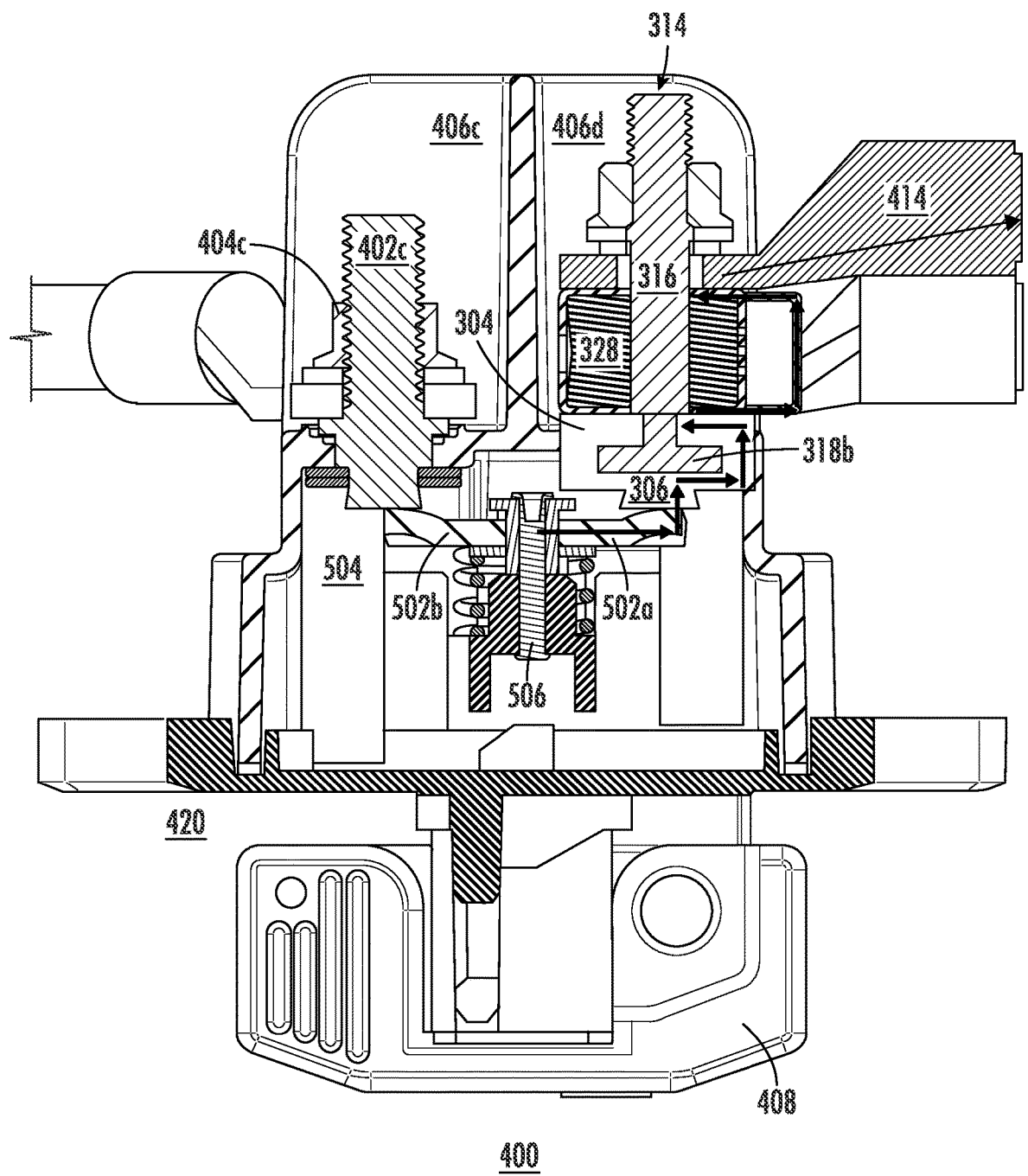
FIG. 8 is a diagram of the disconnect switch assembly of FIGS. 4A and 4B, in accordance with exemplary embodiments.

FIG. 8 is another cross-sectional view of the device assembly 400, according to exemplary embodiments. In contrast to FIGS. 5 and 6, the disconnect switch 420 includes the bottom portion with the lever. Further, the view of FIG. 8 is a mirror image of that seen in FIG. 5, with the quadrant 406c being on the left side and the quadrant 406d being on the right side. The stud 402c is in quadrant 406c, with the hex nut 404c holding it in place in the plastic housing 428 of the disconnect switch 420. The stud 402c is electrically connected to the left portion 502b of the busbar, with the right portion 502a of the busbar being electrically connected to the shaft 306 of the landing pad 302. The lever assembly 506, which is connected to the lever 408, enables or disables connection between the two portions 502a and 502b of the busbar.

Arrows in FIG. 8 shows an electrical path for current traveling through the single fuse assembly 300, according to exemplary embodiments, and assumes the lever 408 is positioned so that the busbar 502 is electrically connected to the stud 402c and the landing pad stud 306, as the busbar acts as a mobile bridge, moving up or down depending on the lever position. Further, a current path in one direction is shown, from the stud 402c in quadrant 406c to the power cable lug 414 in quadrant 406d. However, the current may travel in the opposite direction, that is, from the power cable lug 414 in quadrant 406d to the stud 402c in quadrant 406c. Current travels from the stud 402c, through the left portion 502b of the busbar to the right portion 502a of the busbar. Current then travels up the shaft 306 of the landing pad 302 and around the stud base receptacle 304. Recall that the landing pad 302, a metal terminal, is made of an electrically conductive material, such as copper or copper allow. Further, the stud 314 is electrically insulated at the stud base 318, the optional integrated washer 326 (not shown), and along the above-described portions of the shaft 316. Thus, current does not enter the stud base 318 as it travels around the stud base receptacle 304. Instead, current travels to the single stud fuse 328 and travels around one side of the fuse. From the view of FIG. 8, the current is traveling along a right side. FIGS. 7A-7C, above, show that the fusing element is located on one side of the fuse housing. Thus, from the view of FIG. 8, the fusing element is disposed on the right side of the single stud fuse 328. The current then travels to the power cable lug 414, and onto the circuit, such as a battery, to which the disconnect switch 420 is connected.

Figure 9A:
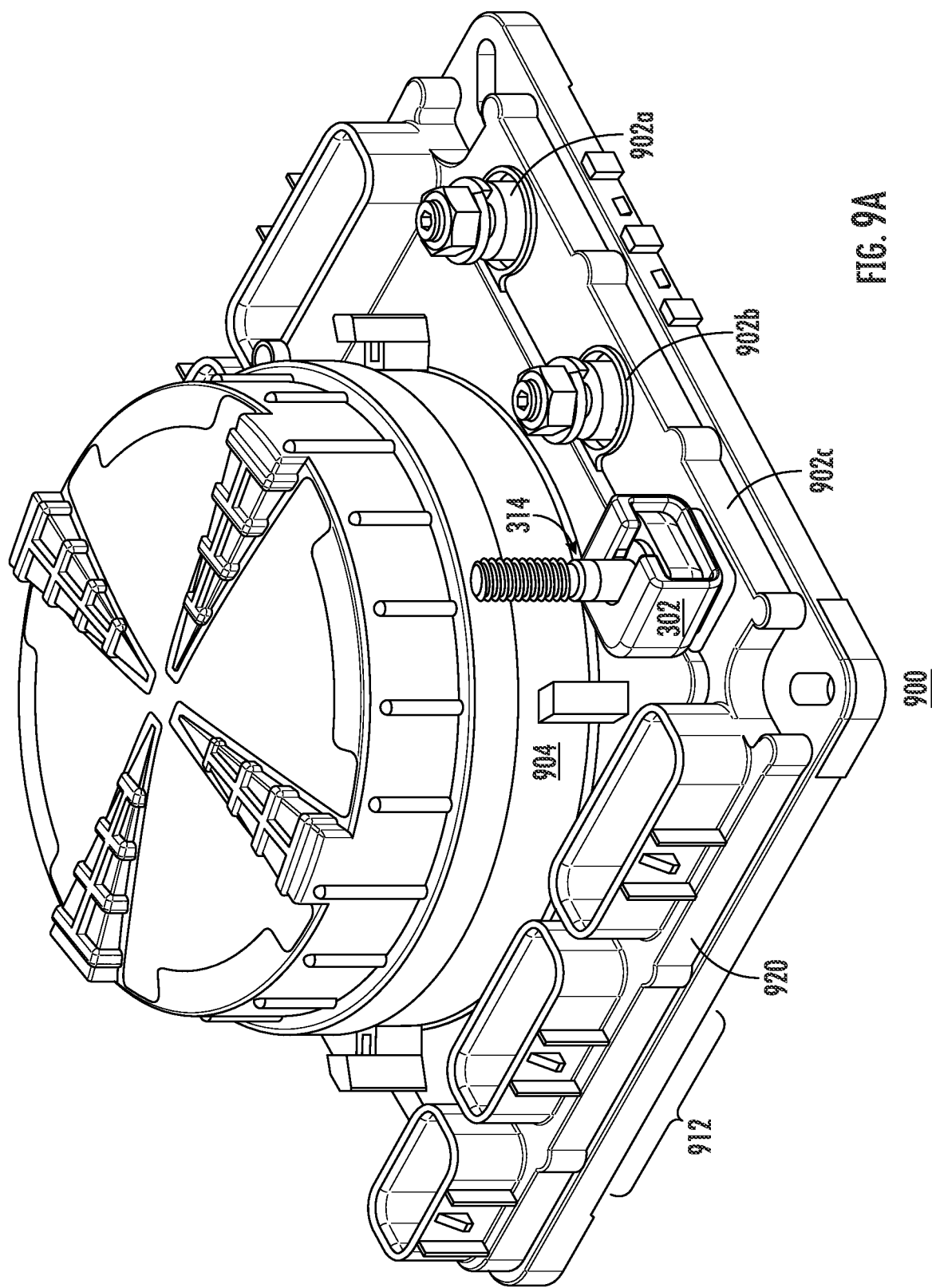

FIGS. 9A and 9B are perspective drawings of a power distribution module (PDM) assembly 900 featuring a PDM 920 and the single stud fuse assembly 300 of FIG. 3, according to exemplary embodiments. In FIG. 9A, only the stud 314 and landing pad 302 are shown; in FIG. 9B, the entire single stud fuse assembly 300 is shown, along with the power cable lug 414. Three stud locations 902a, 902b, and 902c are shown (collectively, "stud positions 902"), with the third stud position 902c being replaced with the stud 314 and landing pad 302 (FIG. 9A) or with the entire single stud fuse assembly 300 (FIG. 9B). It is possible for all three stud locations 902a, 902b, and 902c to be replaced with single stud fuse assemblies 300.

As with the disconnect switch 420, the PDM 920 includes circuitry within the housing to establish a connection between the stud positions 902. For example, a first busbar may be disposed between stud position 902a and 902b, thus enabling an electrical connection to be made between the studs disposed on the stud positions. A second busbar may be disposed between stud position 902a and 902c, for enabling an electrical connection between studs disposed thereon. Similarly, a third busbar may be disposed between stud position 902b and 902c. Thus, once terminals are connected between any two of the studs occupying the stud positions 902, a closed circuit may be established. With the single stud fuse assembly 300 being disposed on one, two, or all three of the stud positions 902, the single stud fuse 328 is able to protect the device connected to the terminals.

As with the disconnect switch 420 (FIGS. 4A, 4B, 5, 6, and 8), the assembly 900 including the PDM 920 and the single stud fuse assembly 300 can be used with different sizes of studs, such as M6, M8, or M10. In an exemplary embodiment, any location on the device can be assembled with any one of the stud sizes. The shaft 316 of the stud 314 of the single stud fuse assembly 300 can change while the shaft 306 of the landing pad 302 would not change, and would be sized to fit the plastic housing 904 of the PDM 920. This allows end of line adjustments to customer variations. Further, in an exemplary embodiment, more than one stud location, 902*a*, 902*b*, or 902*c*, can be assembled with any of the stud sizes. Thus, the single stud fuse assembly 300 can occupy any of the stud locations 902 of the PDM 920. Further, the single stud fuse assembly 300 can be placed in more than one stud position 902, such as when the PDM 920 is connected to two different circuits, thus providing fuse protection for both circuits. Finally, customization of the PDM 920 is possible without any retooling of the stud.

Figure 10:
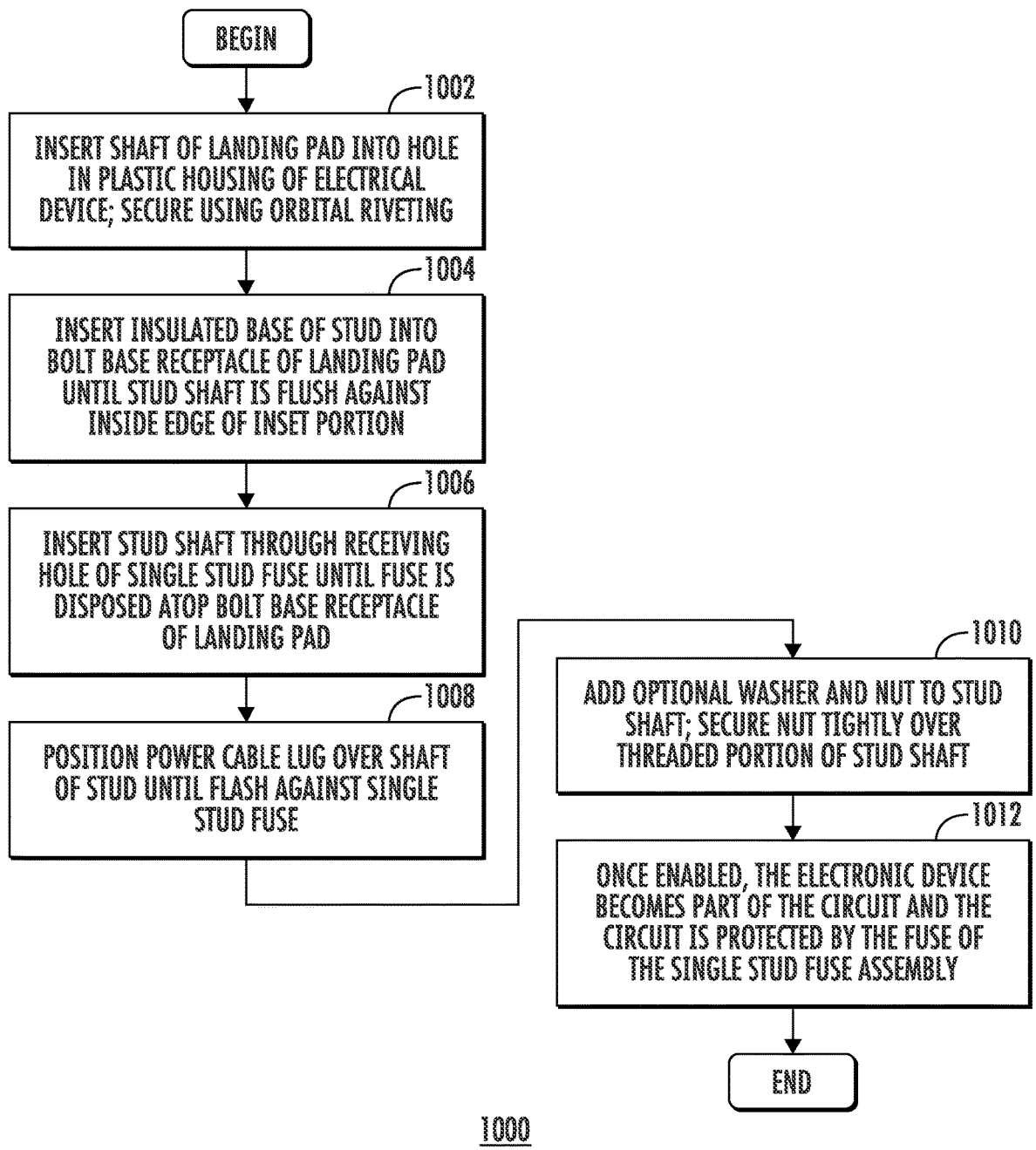
FIG. 10 is a flow diagram illustrating method steps performed in adding a single stud fuse assembly to an electrical device, in accordance with exemplary embodiments.

FIG. 10 is a flow diagram illustrating a method 1000 of assembling a single stud fuse assembly, such as the single stud fuse assembly 300, in an electronic device, such as the disconnect switch 420 or the PDM 920 described and illustrated above. For clarity, the reference numbers of the single stud fuse assembly 300 (FIG. 3) are given in parentheses, though the method steps may apply to other configurations of single stud fuse assemblies. The shaft (306) of the landing pad (302) is inserted into a hole of the housing (504) of the electrical device (block 1102). The electrical device may be made of plastic material similar to that of the disconnect switch 420 and PDM 920 described herein, and a cylindrical hole in the plastic housing (504/904) will be suitable for receipt of the shaft (306) of the single stud fuse assembly 300. The bottom rectangular-cube-like portion of the insulated stud (314), known as the stud base (318), which is insulated, is inserted into the stud base receptacle (304) of the metal terminal (302), known as the landing pad, which is sized to receive the insulated base (318). The shaft (316) of the steel stud (314), some of which is also insulated, fits flush against an inside edge of the inset portion (308) of a top surface of the stud base receptacle (304) (block 1004).

The shaft (316) of the electrically isolated stud 314 is next inserted through the receiving aperture or shaft receptacle (330) of the single stud fuse (328) until the fuse is disposed atop the stud base receptacle (304) of the landing pad (302) (block 1006). At this stage, the insulated portion (324) of the shaft (316) is partially inserted into the shaft receptacle (330) of the single stud fuse (328). The cable lug aperture aperture (416) of the power cable lug (414) is positioned over the shaft (316) of the stud (314) until the power cable lug (414) is flush against the top surface of the single stud fuse (328) (block 1008). The optional washer (332), if present, and nut (334) are disposed over the shaft (316) of the stud (314), and secured tightly thereon (block 1010). Alternatively, the shaft (316) of the stud (314) is secured by a nut having an integrated washer, such as a flange nut, a trilobate nut, or other type of nut that can be used without a washer. The electrical device, once enabled, such as by the lever in the disconnect switch described above, is now part of the circuit at the end of the terminals. Further, the circuit is now protected by the single stud fuse of the single stud fuse assembly (block 1012).

Thus, as illustrated and described herein, any electrical device that is to be part of an electrical circuit in which connection is made by cables, harnesses, or other means, the electrical device having a hole to be blocked (and electrically connected) between a stud and a nut may be a good candidate for adding the single stud fuse assembly 300. The disconnect switch 420 and the power distribution module 920 represent but two of myriad devices that may be suitable for the method operations described in FIG. 10.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

While the present disclosure makes reference to certain embodiments, numerous modifications, alterations and changes to the described embodiments are possible without departing from the sphere and scope of the present disclosure, as defined in the appended claim(s). Accordingly, it is intended that the present disclosure not be limited to the described embodiments, but that it has the full scope defined by the language of the following claims, and equivalents thereof.

The invention claimed is:

1. An electrical device assembly comprising:
an electrical device comprising:
a first stud to be coupled to a first terminal;
a receiving hole in a housing of the electrical device; and
a single stud fuse assembly comprising:
a single stud fuse comprising a shaft receptacle;
a landing pad comprising a landing pad shaft and a stud base receptacle, the landing pad shaft to be orbitally riveted into the receiving hole of the housing; and
an electrically isolated stud comprising a stud shaft and a stud base, wherein:
the stud base is to be inserted into the stud base receptacle;
the single stud fuse is disposed along the stud shaft, with the stud shaft being disposed through the shaft receptacle, the stud shaft to be coupled to a second terminal.

2. The electrical device assembly of claim 1, the single stud fuse assembly further comprising a nut to be threaded over the stud shaft and secured once the second terminal is coupled to the stud shaft.

3. The electrical device assembly of claim 1, wherein the landing pad shaft and stud base receptacle of the landing pad are made from a metal piece made of electrically conductive material.

4. The electrical device assembly of claim 1, wherein the landing pad shaft, once orbitally riveted into the receiving hole of the housing, is not removable.

5. The electrical device assembly of claim 4, wherein the electrically isolated stud is removable from the landing pad.

6. The electrical device assembly of claim 1, wherein the stud base of the electrically isolated stud is inserted into the stud base receptacle of the landing pad before the landing pad shaft is orbitally riveted into the receiving hole of the housing.

7. The electrical device assembly of claim 6, wherein the stud base of the electrically isolated stud is not removable from the stud base receptacle of the landing pad.

8. The electrical device assembly of claim 1, wherein the stud base of the electrically isolated stud is inserted into the stud base receptacle of the landing pad after the landing pad shaft is orbitally riveted into the receiving hole of the housing.

9. The electrical device assembly of claim 1, wherein electrical device is a disconnect switch.

10. The electrical device assembly of claim 1, wherein the electrical device is a power distribution module.

11. An electrical device comprising:
- a first stud and a first nut, wherein a terminal of a battery is to be placed over the first stud before securing the first nut;
- a pocket in a plastic housing of the electrical device;
- a busbar within a housing of the electrical device, the busbar being coupled to the first stud;
- a landing pad comprising a landing pad shaft and a rectangular receptacle, wherein the landing pad is orbital riveted into the pocket until the landing pad shaft is coupled to the busbar; and
- an electrically isolated stud comprising a stud shaft and a stud base, wherein the stud base fits into a side opening of the rectangular receptacle, the stud shaft to receive a single stud fuse and a second terminal of the battery.

12. The electrical device of claim 11, wherein the landing pad shaft and the stud shaft are in a single plane.

13. The electrical device of claim 11, further comprising a nut to be tightened over the stud shaft so that the second terminal of the battery is secure over the single stud fuse.

14. The electrical device of claim 11, wherein a current travels through the first stud, the busbar, the landing pad, a fusible element of the single stud fuse, and the second terminal, and vice-versa, without traveling through the electrically isolated stud.

15. The electrical device of claim 11, wherein the landing pad cannot be removed once orbitally riveted into the pocket.

16. An electrical device assembly comprising:
- an electrical device comprising:
  - a first stud to be coupled to a first terminal of a second electronic device;
  - a receiving hole in a plastic housing;
  - a busbar comprising a first busbar portion and a second busbar portion, wherein the first busbar portion is coupled to the first stud; and
  - a fuse assembly comprising:
    - a fuse comprising a fusing element and a shaft receptacle, the shaft receptacle being disposed in a central location of a rectangular cubic housing and the fusing element being disposed along a side edge of the rectangular cubic housing;
    - a landing pad shaft coupled to a stud base receptacle, wherein the landing pad shaft and the stud base receptacle are made from a metal piece made of electrically conductive material; and
    - an electrically isolated stud comprising a stud base to be slid into a side opening of the stud base receptacle;

wherein the landing pad shaft is disposed into the receiving hole such that the second busbar portion is coupled to the landing pad shaft.

17. The electrical device assembly of claim 16, wherein the landing pad shaft is orbitally riveted into the receiving hole and is thereafter not removable from the electrical device.

18. The electrical device assembly of claim 16, wherein the electrically isolated stud is orbitally riveted into the stud base receptacle and is thereafter not removable from the electrical device.

19. The electrical device assembly of claim 16, wherein the electrical device is a disconnect switch comprising a lever to control connection between the first busbar portion and the second busbar portion.

20. The electrical device assembly of claim 16, wherein the electrical device is a power distribution module and the first busbar portion and the second busbar portion are connected.

* * * * *